United States Patent
Riach et al.

(10) Patent No.: US 8,125,491 B1
(45) Date of Patent: Feb. 28, 2012

(54) MULTIPLE SIMULTANEOUS UNIQUE OUTPUTS FROM A SINGLE DISPLAY PIPELINE

(75) Inventors: Duncan A. Riach, Mountain View, CA (US); Michael A. Ogrinc, San Francisco, CA (US); Brijesh Tripathi, Santa Clara, CA (US); Wayne D. Young, Thatcham (GB)

(73) Assignee: NVIDIA Corporation, Santa Clara, CA (US)

( * ) Notice: Subject to any disclaimer, the term of this patent is extended or adjusted under 35 U.S.C. 154(b) by 855 days.

(21) Appl. No.: 11/936,073

(22) Filed: Nov. 6, 2007

(51) Int. Cl.
*G06T 1/60* (2006.01)
*G09G 5/399* (2006.01)
*G09G 5/36* (2006.01)

(52) U.S. Cl. .................. 345/540; 345/530; 345/547
(58) Field of Classification Search .................. 345/530, 345/540, 547; 725/100, 101, 141
See application file for complete search history.

(56) References Cited

U.S. PATENT DOCUMENTS

| 5,241,372 A | 8/1993 | Ohba et al. |
| 6,931,660 B1 * | 8/2005 | Kalluri et al. .................. 725/131 |
| 2006/0117360 A1 * | 6/2006 | Cooper et al. ................ 725/100 |
| 2006/0290641 A1 | 12/2006 | Ku et al. |

OTHER PUBLICATIONS

Office Action in U.S. Appl. No. 11/955,307 mailed Feb. 28, 2011.

* cited by examiner

*Primary Examiner* — Hau Nguyen
(74) *Attorney, Agent, or Firm* — Patterson & Sheridan, LLP

(57) ABSTRACT

One embodiment of the present invention sets forth a system for generating multiple video output signals from a single video pipeline within a graphics processing unit. Pixel data from more than one display surface is retrieved and multiplexed before being transmitted to a video pipeline for processing. The resulting video pixel data is routed to video output encoders, which selectively accept the video pixel data for transmission to attached display devices.

20 Claims, 3 Drawing Sheets

MULTIPLE SIMULTANEOUS UNIQUE OUTPUTS FROM A SINGLE DISPLAY PIPELINE

BACKGROUND OF THE INVENTION

1. Field of the Invention

Embodiments of the present invention relate generally to graphics system architectures and more specifically to generating multiple simultaneous unique outputs from a single display pipeline.

2. Description of the Related Art

A typical computer system includes, without limitation, a central processing unit (CPU), a graphics processing unit (GPU), at least one display device, and one or more input devices, such as a keyboard and a mouse. The display device generates a sequence of images from sequential video frames, each composed from a structured stream of pixels. The stream of pixels is typically generated by a video pipeline within the GPU. The video pipeline performs pixel processing operations, known to persons skilled in the art, which enable proper display of video images. For example, the video pipeline may perform "gamma correction" on a pixel in order to properly account for certain non-linear characteristics of an attached display device. A display device is frequently called a "head." Consequently, the circuitry within the GPU used to support the display device is also referred to as a "head."

When a user attaches one or more additional display devices to the computer system to view independent images, additional video pipelines are needed to generate the independent images. Modern GPU devices typically include two independent video pipelines, allowing the user to attach one or two display devices to the GPU. Each GPU also commonly includes numerous digital and analog video output ports used to support various video standards. However, despite the availability of these video output ports included in the GPU device, the GPU is still limited to driving two display devices (or the number of display devices equal to the number of available independent video pipelines within the GPU).

One approach to increasing the overall number of display devices that may be attached to a computer system is to configure the computer system to include additional GPUs. These additional GPUs provide additional video pipelines that can drive the independent display devices. One popular computer system configuration includes four similar or identical display devices. This configuration requires that two GPUs be present within the computer system, where each GPU includes two video pipelines. While many applications that require four display devices do not require the additional graphics processing capability of an additional GPU, the second GPU is nonetheless required in order to provide the necessary video pipelines used to drive the additional display devices. The second GPU increases the cost of the computer system and increases the amount of power needed to operate the computer system.

Another approach to increasing the number of display devices that may be attached to a computer system is to include additional independent video pipelines within the GPU, thereby allowing the GPU to drive additional independent display devices. However, the circuitry needed to implement a video pipeline is expensive and would add to the overall cost of the GPU, which should be optimized for the common usage case of driving one or two display devices.

As the foregoing illustrates, what is needed in the art is a GPU architecture that accommodates additional display devices without the expense of including additional display pipelines within the GPU.

SUMMARY OF THE INVENTION

One embodiment of the present invention sets forth a system for processing pixel data for display. The system includes a local memory configured to store a plurality of images, a means for interleaving pixel data associated with a first image stored within the local memory and pixel data associated with a second image stored within the local memory to generate a first stream of interleaved pixel data, a video pipeline configured to process the first stream of interleaved pixel data, and a cross bar configured to replicate and route the processed first stream of interleaved pixel data to a first set of two or more video output encoders. Each video output encoder in the first set is configured to extract selected display data from the processed first stream of interleaved pixel data for display.

One advantage of the disclosed system is that, by interleaving pixels from different images, the interleaved pixels for multiple heads may be processed within the same video pipeline, thereby achieving greater overall efficiency within the host GPU. In particular, a single GPU with two independent video pipelines may be configured to support four display devices with negligible additional cost.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
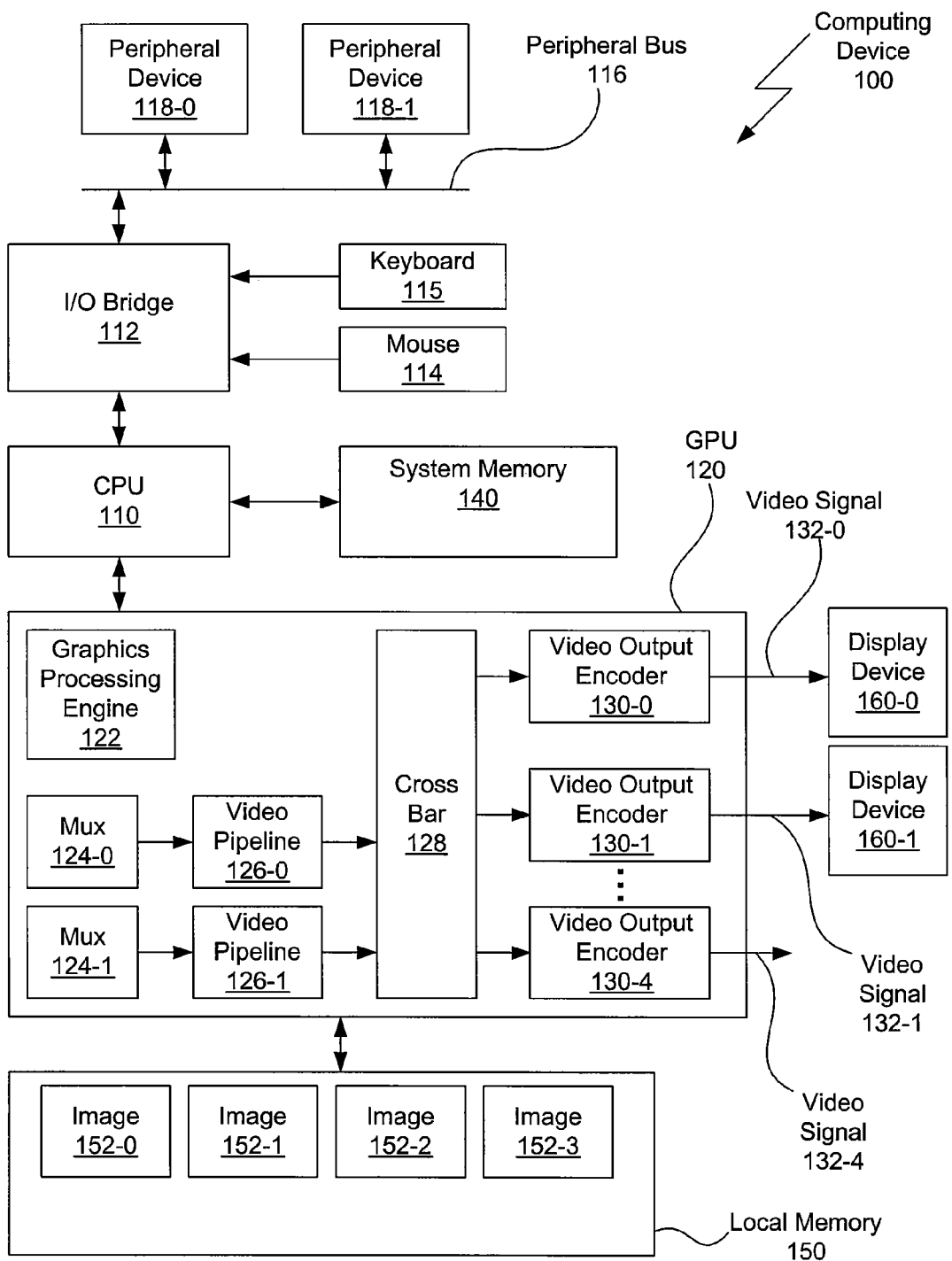
FIG. 1 depicts a computing device in which one or more aspects of the invention may be implemented.

FIG. 1 depicts a computing device 100 in which one or more aspects of the invention may be implemented. The computing device 100 includes a central processing unit (CPU) 110, system memory 140, an I/O bridge 112, a mouse 114, a keyboard 115, and peripheral devices 118 attached to the I/O bridge 112 via peripheral bus 116. The computing device 100 also includes a graphics processing unit (GPU) 120 with attached local memory 150 and attached display devices 160.

The CPU 110 processes programming instructions stored within system memory 140 and coordinates the activities of the I/O bridge 112 and GPU 120. The I/O bridge 112 enables the CPU 110 to interface to peripheral devices 118 via the peripheral bus 116. Peripheral devices 118 may include, without limitation, a hard disk drive adapter and a network adapter. The peripheral bus 116 may be a Peripheral Component Interconnect (PCI) type bus or any other appropriate type of system bus. The I/O bridge 112 also receives input from the keyboard 115 and mouse 114 for processing by the CPU 110.

The CPU 110 directs the GPU 120 to generate images 152, which may be stored in local memory 150, or in any other technically appropriate memory system. For example, images 152 may also be stored in system memory 140. Each image 152-0 through 152-3 may be displayed on a corresponding display device. For example, image 152-0 may be displayed on display device 160-0 via the GPU 120.

The GPU 120 may include a graphics processing engine 122, video output encoders 130, a cross bar 128, video pipelines 126, and multiplexers 124. The graphics processing engine 122 may include a plurality of processing elements, such as fixed function and programmable processing cores.

The video output encoders 130 receive pixel data and timing data represented in digital form and generate a set of output signals 132 that conform to a selected video signal standard. For example, the video output encoder 130 may generate analog video signals consistent with the video graphics adapter (VGA) industry standard. Alternately, the video output encoder 130 may generate a set of serial high-speed digital bit streams consistent with the digital video interface (DVI) industry standard. A given video output encoder 130 is typically configured to produce only analog or only digital signals, therefore, a GPU 120 may include enough video output encoders 130 to accommodate the various industry standards for video signals. In one embodiment, the video output encoders 130 incorporate a de-multiplexer circuit (not shown) configured to select certain data presented to the video output encoder 130 for display, while discarding other data not intended for the given video output encoder 130.

The cross bar 128 routes data from video pipelines 126 to video encoders 130. For example, the cross bar 128 may be configured to route data from video pipeline 126-0 to video encoder 130-1 and data from video pipeline 126-1 to video encoder 130-0. Or the cross bar 128 may be configured to route the same data from video pipeline 126-0 to video output encoder 130-0 and also video output encoder 130-1. In this second scenario, pixel data for both video output encoder 130-0 and 130-1 are interleaved in the same data stream. The video output encoder 130-0 selects only data, referred to as "selected display data," that is intended for display on display device 160-0. The video output encoder 130-0 discards data intended for display device 160-1. Similarly, video output encoder 130-1 extracts selected display data intended for display on display device 160-1, while discarding data intended for display device 160-0.

The video pipelines 126 receive interleaved pixel data from multiplexers 124 and generate processed interleaved pixel data. For example, the video pipelines 126 may perform a gamma correction on the interleaved pixel data to account for non-linearity exhibited by the display devices 160. The processed interleaved pixel data is de-multiplexed by video output encoders 130 and used for display on the display devices 160. The multiplexers 124 receive pixel data from one or more images 152 to generate the interleaved pixel data. The interleaved pixel data may include pixels for a single head, or interleaved pixels for multiple heads.

Figure 2:
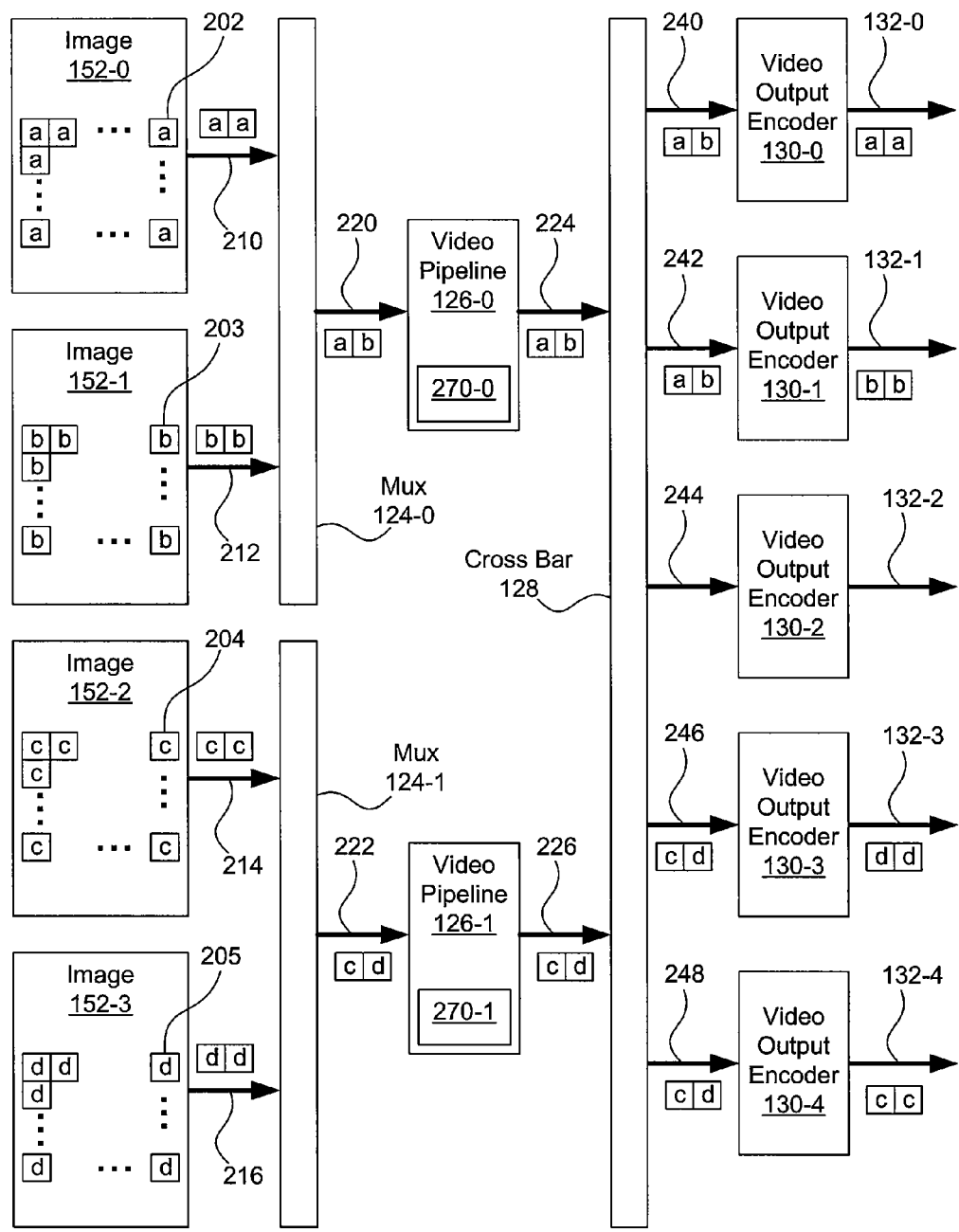
FIG. 2 illustrates a video pipeline configured to process pixels that are interleaved from two different source images, according to one embodiment of the invention.

FIG. 2 illustrates video pipelines 126 configured to process pixels that are interleaved from two different source images, according to one embodiment of the invention. Image 152-0 includes one or more pixels 202, marked "a." Image 152-1 includes one or more pixels 203, marked "b." The pixels 202 are transmitted as pixel data 210 to multiplexer 124-0. Similarly, the pixels 203 are transmitted as pixel data 212 to multiplexer 124-0. The multiplexer 124-0 interleaves the pixels 202, 203 to generate interleaved pixel data 220, which includes alternating pixels from image 152-0 and 152-1. The video pipeline 126-0 processes the pixels 202, 203 transmitted within the interleaved pixel data 220 using technically appropriate techniques, including techniques that may be well-known and substantially similar to non-interleaved processing, to generate processed interleaved pixel data 224.

The crossbar 128 replicates and routes the processed interleaved pixel data 224 to two or more video output encoders 130. For example, the processed interleaved pixel data 224 may be routed to video output encoder 130-0 (via data stream 240), as well as to video output encoder 130-1 (via data stream 242). In this scenario, pixels 202 are processed by video pipeline 126-0 and routed, along with pixels 203, to video output encoder 130-0. Video output encoder 130-0 selects only data related to pixels 202 to generate a video output signal 132-0. Similarly, pixels 203 are processed by video pipeline 126-0 and routed, along with pixels 202, to video output encoder 130-1. Video output encoder 130-1 selects only data related to pixels 203 to generate a video output signal 132-1.

In a similar way, pixels 204 from image 152-2 are processed by video pipeline 126-1 in order to generate video output signal 132-4 and pixels 205 from image 152-3 are processed by video pipeline 126-1 in order to generate video output signal 132-3.

By interleaving pixel data processed by the video pipelines 126, logical heads associated with a specific video pipeline 126-0 or 126-1 are available to drive multiple display devices. These logical heads are also referred to as "sub-heads." While the video pipelines 126 may perform a substantial portion of pixel processing without needing to know which pixel is associated with which sub-head, cursor logic 270 within the video pipelines 126 should be aware of which sub-head is associated with a given pixel being processed in order to properly generate a cursor for display on the appropriate sub-head. The cursor logic 270 may examine a tag associated with a pixel being processed by the video pipeline 126 to determine if the cursor should be visible on the target sub-head of the pixel. If the cursor should be visible on the target sub-head and the cursor intersects the pixel in screen space, then the cursor logic 270 may perform an overlay operation on the pixel being processed. If the cursor should not be visible on the target sub-head, then the cursor logic 270 does not perform an overlay operation on the pixel being processed.

Persons skilled in the art will recognize that there are many known techniques for tagging pixel data with sub-head information to properly inform the cursor logic 270 of an association between pixel data and a target sub-head.

Figure 3:
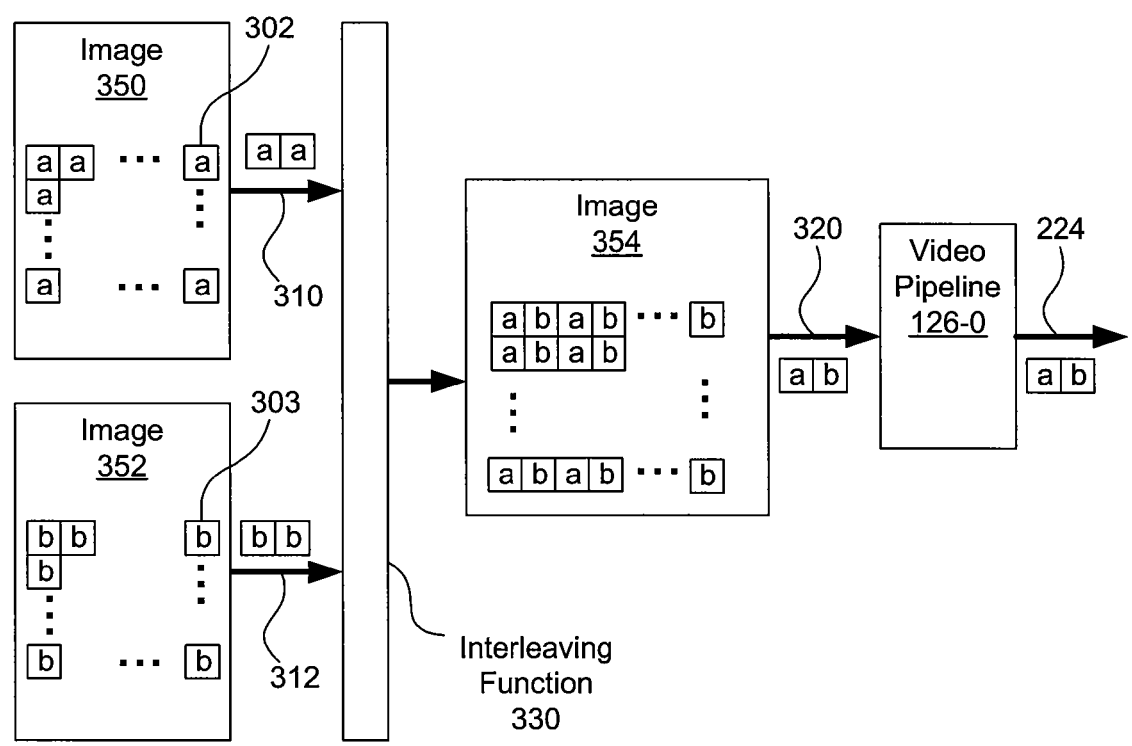
FIG. 3 illustrates a video pipeline configured to process pixels from a single source image that is spliced together from two different source images, according to one embodiment of the invention.

FIG. 3 illustrates a video pipeline 126-0 configured to process pixels from a single source image 354 that is spliced together from two different source images 350, 352, according to one embodiment of the invention. Each image 350, 352 corresponds to unique source images for display on independent display devices (not shown).

Image 350 includes pixels 302, which are transmitted to an interleaving function 330 as pixel data 310. Image 352 includes pixels 303, which are transmitted to an interleaving function 330 as pixel data 312. The interleaving function 330 generates the single source image 354 by alternating pixels from pixel data 310 and pixel data 312. The interleaving function 330 may be implemented using software, dedicated hardware, or any combination thereof.

Data within the single source image 354 is transmitted to the video pipeline 126-0 as interleaved pixel data 320, which includes pixels from each source image 350 and 352. The interleaved pixel data 320 is substantially identical in form to interleaved pixel data 220 of FIG. 2. Video pipeline 126-0 processes the data stream 320 and generates processed interleaved pixel data 224. The processed interleaved pixel data 224 is then routed and displayed according to the discussion in FIG. 2.

In sum, a system is presented for generating multiple video output signals from a single video pipeline within a graphics processing unit. In one embodiment pixel data is retrieved from two or more images within frame buffer memory and interleaved by a multiplexer prior to being processed by the video pipeline. In another embodiment, pixel data is retrieved from a single image previously spliced together from two or more source images. A cross bar transmits the processed pixel data to video output encoders, which may receive a combination of pixels generated by the video pipeline. Each video output encoder selects which pixels should be transmitted to the respective display device, while discarding pixels destined to different display devices. By multiplexing the use of video pipeline resources to process pixels for multiple heads, greater overall efficiency is achieved within the host GPU. In particular, a single GPU with two independent video pipelines may be configured to support four display devices with negligible additional cost.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

We claim:

1. A system for processing pixel data for display, the system comprising:
   a memory configured to store a plurality of images;
   an interleaving unit configured to interleave pixel data associated with a first image stored within the memory and pixel data associated with a second image stored within the memory to generate a first stream of interleaved pixel data;
   a video pipeline configured to process the first stream of interleaved pixel data; and
   a cross bar configured to replicate and route the processed first stream of interleaved pixel data to a first set of two or more video output encoders, wherein each video output encoder in the first set receives a separate copy of the processed first stream that includes processed pixel data associated with the first image and the second image and is configured to extract selected display data from the processed first stream of for display.

2. The system of claim 1, wherein the interleaving unit comprises a multiplexer.

3. The system of claim 2, wherein the multiplexer interleaves one pixel from the first image with one pixel from the second image in an alternating fashion to generate the first stream of interleaved pixel data.

4. The system of claim 2, wherein the multiplexer interleaves a repeating pattern of at least two pixels from the first image with at least one pixel from the second image in an alternating fashion to generate the first stream of interleaved pixel data.

5. The system of claim 1, wherein the interleaving unit comprises an interleaving function configured to combine the pixel data associated with the first image and the pixel data associated with the second image to form an image of interleaved pixel data from which the first stream of interleaved pixel data is extracted.

6. The system of claim 1, wherein the video pipeline includes cursor logic that overlays a cursor image within the selected display data associated with one sub-head.

7. The system of claim 1, wherein at least one of the two or more video output encoders generates a video signal compatible with the video graphics adapter standard or the digital video interface standard.

8. The system of claim 1, further comprising:
   a second interleaving unit configured to interleave pixel data associated with a third image stored within the memory and pixel data associated with a fourth image stored within the memory to generate a second stream of interleaved pixel data; and
   a second video pipeline configured to process the second stream of interleaved pixel data,
   wherein the cross bar is configured to replicate and route the processed second stream of interleaved pixel data to a second set of two or more video output encoders, wherein each video output encoder in the second set receives a separate copy of the processed second stream that includes processed pixel data associated with the third image and the fourth image and is configured to extract selected display data from the processed second stream for display.

9. The system of claim 8, wherein the second interleaving unit comprises a second multiplexer.

10. The system of claim 8, wherein the second interleaving unit comprises a second interleaving function configured to combine the pixel data associated with the third image and the pixel data associated with the fourth image to form a second image of interleaved pixel data from which the second stream of interleaved pixel data is extracted.

11. A computing device configured for processing interleaved pixel data, the computing device comprising:
    a central processing unit coupled to a system memory; and
    a graphics processing unit coupled to the central processing unit and to a local memory and/or system memory configured to store a plurality of images, wherein the graphics processing unit includes a subsystem for processing pixel data for display, the subsystem having:
       an interleaving unit configured to interleave pixel data associated with a first image stored within the memory and pixel data associated with a second image stored within the memory to generate a first stream of interleaved pixel data,
       a video pipeline configured to process the first stream of interleaved pixel data, and
       a cross bar configured to replicate and route the processed first stream of interleaved pixel data to a first set of two or more video output encoders, wherein each video output encoder in the first set receives a separate copy of the processed first stream that includes processed pixel data associated with the first image and the second image and is configured to extract selected display data from the processed first stream for display.

12. The computing device of claim 11, wherein the interleaving unit comprises a multiplexer.

13. The computing device of claim 12, wherein the multiplexer interleaves one pixel from the first image with one pixel from the second image in an alternating fashion to generate the first stream of interleaved pixel data.

14. The computing device of claim 12, wherein the multiplexer interleaves a repeating pattern of at least two pixels from the first image with at least one pixel from the second image in an alternating fashion to generate the first stream of interleaved pixel data.

15. The computing device of claim 11, wherein the interleaving unit comprises an interleaving function configured to combine the pixel data associated with the first image and the pixel data associated with the second image to form an image of interleaved pixel data from which the first stream of interleaved pixel data is extracted.

16. The computing device of claim 11, wherein the video pipeline includes cursor logic that overlays a cursor image within the selected display data associated with one sub-head.

17. The computing device of claim 11, wherein at least one of the two or more video output encoders generates a video signal compatible with the video graphics adapter standard or the digital video interface standard.

18. The computing device of claim 11, further comprising:
a second interleaving unit configured to interleave pixel data associated with a third image stored within the memory and pixel data associated with a fourth image stored within the memory to generate a second stream of interleaved pixel data; and
a second video pipeline configured to process the second stream of interleaved pixel data,
wherein the cross bar is configured to replicate and route the processed second stream of interleaved pixel data to a second set of two or more video output encoders, wherein each video output encoder in the second set receives a separate copy of the processed second stream that includes processed pixel data associated with the third image and the fourth image and is configured to extract selected display data from the processed second stream for display.

19. The computing device of claim 18, wherein the second interleaving unit comprises a second multiplexer.

20. The computing device of claim 18, wherein the second interleaving unit comprises a second interleaving function configured to combine the pixel data associated with the third image and the pixel data associated with the fourth image to form a second image of interleaved pixel data from which the second stream of interleaved pixel data is extracted.

* * * * *

UNITED STATES PATENT AND TRADEMARK OFFICE
CERTIFICATE OF CORRECTION

PATENT NO.       : 8,125,491 B1  
APPLICATION NO.  : 11/936073  
DATED            : February 28, 2012  
INVENTOR(S)      : Duncan A. Riach et al.

Page 1 of 1

It is certified that error appears in the above-identified patent and that said Letters Patent is hereby corrected as shown below:

In Column 5, Claim 1, Line 47, after "processed first stream" please delete "of".

Signed and Sealed this
Twenty-ninth Day of January, 2013

David J. Kappos
*Director of the United States Patent and Trademark Office*